(12) United States Patent
Bagwell et al.

(10) Patent No.: US 6,806,960 B2
(45) Date of Patent: Oct. 19, 2004

(54) COMPACT BEAM RE-TRACING OPTICS TO ELIMINATE BEAM WALK-OFF IN AN INTERFEROMETER

(75) Inventors: Kerry D. Bagwell, Campbell, CA (US); Greg C. Felix, San Jose, CA (US); John J. Bockman, Santa Clara, CA (US); Alan B. Ray, Palo Alto, CA (US)

(73) Assignee: Agilent Technologies, Inc, Palo Alto, CA (US)

( * ) Notice: Subject to any disclaimer, the term of this patent is extended or adjusted under 35 U.S.C. 154(b) by 176 days.

(21) Appl. No.: 10/285,058

(22) Filed: Oct. 30, 2002

(65) Prior Publication Data

US 2003/0197870 A1 Oct. 23, 2003

Related U.S. Application Data

(63) Continuation-in-part of application No. 10/126,002, filed on Apr. 18, 2002.

(51) Int. Cl.[7] .................................................. G01B 9/02
(52) U.S. Cl. ........................ 356/487; 356/493; 356/500
(58) Field of Search ................................ 356/486, 487, 356/493, 498, 500, 516

(56) References Cited

U.S. PATENT DOCUMENTS

| | | |
|---|---|---|
| 4,711,574 A | 12/1987 | Baldwin |
| 4,784,489 A | 11/1988 | Cutler et al. |
| 4,784,490 A | 11/1988 | Wayne |
| 4,930,894 A | 6/1990 | Baldwin |
| 5,064,289 A | 11/1991 | Bockman |
| 5,677,768 A | 10/1997 | Bockman |
| 6,014,216 A | 1/2000 | Zorabedian |
| 6,020,964 A * | 2/2000 | Loopstra et al. ............ 356/500 |
| 6,313,918 B1 | 11/2001 | Hill et al. |

OTHER PUBLICATIONS

Agilent Technologies, Inc., "Laser and Optics User Manual", Aug. 2000.

* cited by examiner

Primary Examiner—Samuel A. Turner

(57) ABSTRACT

A multi-axis interferometer uses a combined beam for a first pass through the interferometer optics. Measurement and reference components of the combined beam that exit the interferometer optics are subject to walk-off that measurement or reference reflector misalignment can cause. A return reflector and non-polarizing beam splitter system split the combined beam into separated input beams for the various axes of the interferometer and return the separated beams for respective second passes through the interferometer optics. Walk-off for the separated beams in the interferometer optics cancels the walk-off for the combined beam to eliminate beam walk-off in separated output beams. Sharing a combined beam for a first pass through the interferometer optics reduces the sizes required for the interferometer optics and reference and measurement mirrors. The multi-axis interferometer may have a single return reflector.

20 Claims, 7 Drawing Sheets

COMPACT BEAM RE-TRACING OPTICS TO ELIMINATE BEAM WALK-OFF IN AN INTERFEROMETER

CROSS-REFERENCE TO RELATED PATENT APPLICATION

This patent document is a continuation-in-part and claims benefit of the earlier filing date of U.S. patent application Ser. No. 10/126,002, filed Apr. 18, 2002, which is hereby incorporated by reference in its entirety.

BACKGROUND

Interferometers commonly use polarization encoding to distinguish reference beams from measurement beams. In a plane-mirror interferometer 100 illustrated in FIG. 1, for example, an input beam IN contains two linearly polarized components having orthogonal linear polarizations. A polarizing beam splitter 110 in interferometer 100 separates the two components creating a reference beam and a measurement beam.

In FIG. 1, polarizing beam splitter 110 reflects the component corresponding to the reference beam. The reference beam thus travels down a path R1 through a quarter-wave plate 120 to a reference mirror 130. Reference mirror 130 has a fixed mounting relative to polarizing beam splitter 110 and is aligned perpendicular to path R1 so that the reference beam reflects from a reference mirror 130 and travels back through quarter-wave plate 120 along path R1. Passing twice through quarter-wave plate 120 effectively rotates the polarization of the reference beam by 90° so that the reference beam returning on path R1 passes through polarizing beam splitter 110 and enters a cube corner reflector 140 along a path R2.

Cube corner reflector 140 reflects the reference beam onto an offset path R3, and the reference beam traverses polarizing beam splitter 110 directly to a collinear path R4. The reference beam then continues along a path R4 through quarter-wave plate 120 before again reflecting from reference mirror 130 and returning through quarter-wave plate 120 along path R4. The second pair of trips through quarter-wave plate 120 changes the polarization of the reference beam, so that polarizing beam splitter 110 reflects the reference beam from path R4 onto an output path ROUT.

Polarizing beam splitter 110 of FIG. 1 transmits the input polarization component corresponding to the measurement beam so that the measurement beam travels along a path M1 through a quarter-wave plate 150 to a measurement mirror 160. Measurement mirror 160 is on an object such as a translation stage in processing equipment for integrated circuit fabrication. Measurement mirror 160 is ideally perpendicular to path M1, but generally, measurement mirror 160 may have an angular orientation that is subject to variations as the object moves. FIG. 1 shows a configuration where measurement mirror 160 has a non-zero yaw angle relative to path M1. As a result, the measurement beam reflected from measurement mirror 160 returns along a path M1' that forms a non-zero angle (i.e., twice the yaw angle) with path M1.

The measurement beam, which passes twice through quarter-wave plate 150, has its linear polarization rotated by 90°, so that polarizing beam splitter 110 reflects the measurement beam from path M1' to a path M2 into cube corner 140. From cube corner 140, the measurement beam travels path M3, reflects in polarizing beam splitter 110 to a path M4 through quarter-wave plate 150 to measurement reflector 160. The measurement beam then returns from measurement reflector along a path M4' through quarter-wave plate 150. Path M4' forms an angle with path M4 according to the orientation of measurement mirror 160 and is parallel to path M1. Polarizing beam splitter 110 transmits the measurement beam from path M4' to an output path MOUT.

Interferometer electronics (not shown) can analyze phase information from a combination of the reference and measurement beams to measure movement of measurement mirror 160. In particular, a merged beam resulting from merging the reference and measurement beams can be made to interfere to produce a measurement signal. When measurement mirror 160 is moving along the direction of the measurement beam, each reflection of the measurement beam from measurement mirror 160 causes a Doppler shift in the frequency of the measurement beam and a corresponding change in the beat frequency of the merged beam. In a DC interferometer where the measurement and reference beams initially have the same frequency, the beat frequency of the merged beam corresponds to the Doppler shift. In an AC interferometer where the measurement and reference beams initially have slightly different frequencies, the change in the beat frequency indicates the Doppler shift.

AC interferometers typically use an input beam having orthogonal, linear polarization components with slightly different frequencies. Imperfect polarization separation of the frequency components of the input beam can cause cyclic errors in the Doppler shift measurement. If the reference beam, for example, contains some light at the frequency intended for the measurement beam, the reference beam by itself gives rise to an error signal having the beat frequency depending on the frequencies of the input components. If the error signal becomes too large when compared to the measurement signal, accurate measurements become difficult. Accordingly, maximizing the measurement signal is important for accurate measurements.

Maximizing the measurement signal for AC or DC interferometers requires efficient combination of the measurement and reference beams, and combination of the reference and measurement beams is most efficient when the output paths ROUT and MOUT for the reference and measurement beams are collinear. Achieving collinear output beams from interferometer 100 depends on proper alignment of reference mirror 130 and measurement mirror 160.

In the properly aligned configuration, measurement mirror 160 is perpendicular to path M1, and reflected paths M1' and M4' are collinear with incident paths M1 and M4. As a result, measurement paths M2, M3, and MOUT respectively coincide with reference paths R2, R3, and ROUT when measurement mirror 160 is ideally aligned. If measurement mirror 160 is out of alignment, paths M1 and M1' form an angle that depends on the misalignment of measurement mirror 160, and the reference and measurement paths are skewed relative to each other. The angular difference or separation between the measurement and reference paths continues until the second reflection from measurement mirror 160. After the second reflections, measurement path M4' and output path MOUT become parallel to the output path ROUT for the reference beam. However, the angular variation of measurement mirror 160 still displaces the measurement beam output path MOUT relative to the reference beam output path ROUT. This phenomenon is commonly referred to as beam walk-off.

When the beam walk-off is negligible compared to the diameters for the reference and measurement beams, the merged beam provides a strong measurement signal. However, a misalignment of measurement mirror 160 by about 0.001 radians or more in concert with a large distance (on the order of 0.5 meters or more) between beam splitter 110 and mirror 160 in some precision interferometers causes a walk-off that is a significant fraction of the beam diameters. (The walk-off in a plane-mirror interferometer is generally about $4L\alpha$, where L is the distance between the interferometer and measurement mirror 160 and $\alpha$ is the angular misalignment in radians of measurement mirror 160.) The resulting decrease in the overlapped area of the measurement and reference beams causes a significant drop off in the measurement signal, making the cyclic error signal more significant and making accurate measurements difficult.

Another problem arising from beam walk-off is the dynamic range of measurement signal during operation of interferometer 100. In particular, the light intensity in the overlapped beam can vary from a best case having a maximum overlap to a worst-case have a relatively small overlap. The intensity of the measurement signal thus depends on the alignment of measurement mirror 160, and the alignment changes during operation of interferometer 100, particularly when the object being measured moves. The input beam must have sufficient power to provide a measurable signal in the worst-case alignment, which significantly reduces energy efficiency of interferometer 100. Additionally, the optical receiver and measurement electronics must have a dynamic range sufficient to handle both the worst case low measurement signal levels and the best case high measurement signal levels.

Yet another drawback of beam walk-off arises from non-uniformity of the wave fronts of the beams. Typically, beam curvature, wedge angles, and aberrations of the beams themselves and optical surfaces traversed by one beam but not the other can cause wave front phase differences. Measurement beam walk-off can change the overlap and specifically cause the measured phase of the signal to change even if the distance between mirror 160 and beam splitter 110 did not change.

Interferometer 100 employs cube corner reflector 140 to redirect the reference and measurement beams for additional reflections from respective plane-mirror reflectors 130 and 160. As noted above, cube corner reflector 140 and the additional reflections avoid angular separations between output beam paths ROUT and MOUT. The additional reflections also increase (i.e., double) the Doppler shift of the measurement beam and can increase the measurement resolution of the interferometer. A further cube corner reflector might be added to further increase the number of reflections of the measurement beam from measurement reflector 160 (and the number of reflections of the reference beam from the reference reflector 130). A shortcoming of using a cube corner reflector is the resulting increase in the beam walk-off (e.g., doubling beam walk-off when doubling the number of reflections).

A dynamic beam steering system could measure the relative position of the measurement and reference beams during operation of interferometer 100 and then dynamically adjust reference mirror 130 or another optical element in interferometer 100 to minimize the walk-off. Such dynamic steering systems tend to be complex, expensive, and vulnerable to failure. Accordingly, more efficient and less complex systems and methods for reducing or eliminating walk-off are desired. Ideally, the systems that reduce or eliminate walk-off will be compact and suitable for operation in limited working spaces.

SUMMARY

In accordance with an aspect of the invention, an interferometer returns measurement and reference beams for an additional pass through the interferometer optics along paths that either retrace a first pass through the interferometer optics or follow paths parallel to the first pass. As a result, additional reflections of the measurement and reference beams from their respective reflectors eliminate walk-off between measurement and reference beams in a final merged output beam.

In an interferometer having multiple measurement axes, input beams for the different axes can be separated from each other after a combined beam undergoes a first pass through the interferometer optics. During the first pass, a combined measurement beam undergoes a first pair of reflections from a measurement mirror before being separated into separate measurement beams, one for each measurement axis. Each of the separated measurement beams separately pass a second time through the interferometer optics and undergoes a second pairs of reflections from the measurement mirror. Similarly, a combined reference beam makes a first pass through the interferometer optics before being split into separated reference beams that make a second pass through the interferometer optics.

The combination of the reflections of the combined measurement/reference beams from the measurement/reference reflectors during the first pass and the reflections of the separated measurement/reference beams from the measurement/reference reflectors during the second pass eliminates beam walk-off due to misalignment of the measurement or reference mirror. During each pass, a pair of reflections from the measurement mirror and a pair of reflections from the reference reflector eliminates angular separation between the measurement and reference beams.

A multi-axis interferometer having N measurement axes separates the combined beam into N separated beams. The combined beam and the separated beams have different paths through the interferometer optics and separated reflection areas on the measurement and reference mirrors. The areas of the measurement and reference mirrors accommodate N+1 pairs of reflections instead of 2N pairs of reflections, which may otherwise be required to separately generate output beams with no beam walk-off. The measurement and reference mirrors may thus be smaller. The reduction in the number of separate beam paths also reduces the size of the interferometer optics.

One specific embodiment of the invention is a multi-axis interferometer that includes a main beam splitter system, measurement and reference reflector systems, a return reflector, and a secondary beam splitter system. The main beam splitter system receives an input beam and separates the input beam, typically according to polarization, into a combined measurement beam and a combined reference beam. The measurement and reference reflector systems respectively receive and reflect back the combined measurement beam and the combined reference beam from the main beam splitter system. A retroreflector can then direct the combined measurement beam and the combined reference beam back for respective second reflections from the respective measurement and reference reflector systems. After the pairs of reflections, the main beam splitter system forms a combined output beam in which central axes of the combined measurement beam and the combined reference beam are parallel and walked-off from each other by a distance that depends on relative misalignment of the reflector systems.

The return reflector and the secondary beam splitter receive the combined output beam from the main beam splitter system, split the combined output beams into separated beams that are directed back into the main beam splitter system. When the return reflector reflects the combined beam before the secondary beam splitter system splits the combined beam into the separated beams, the interferometer can use a single return reflector for all of the measurement axes, instead of requiring one return reflector per measurement axis.

The main beam splitter system splits each of the separated input beams into separated measurement and reference beams that respectively reflect at least once from the measurement and reference reflector systems and then recombine in pairs to form separated output beams corresponding to the separated input beams. Retroreflectors corresponding to the separated beams can direct the respective separated measurement/reference beams back for second reflections from the measurement/reference reflector systems.

The main polarizing system generally includes a polarizing beam splitter that splits the input beam by polarization to form reference and measurement beams. The reference reflector system typically includes a first quarter-wave plate and a reference reflector; and the measurement reflector system typically includes a second quarter-wave plate and a measurement reflector for mounting on an object being measured by the interferometer. The secondary beam splitter system typically includes a non-polarizing beam splitter so that the separated beams returning to the main beam splitter system contain polarization components that the main beam splitter system can split to form separated measurement and reference beams.

Another specific embodiment of the invention is a multi-axis interferometer including interferometer optics, a beam splitter system, and a return reflector. The interferometer optics split an input beam into a reference beam and a measurement beam and direct the measurement beam for at least one reflection from a measurement reflector that is on an object being measured. The interferometer optics similarly direct the reference beam for at least one reflection from a reference reflector. In the interferometer optics, the reference and measurement beams merge into a combined beam in which the reference and measurement beams are parallel but subject to walk-off that depends on the alignments and positions of the measurement and reference reflectors. The return reflector receives the combined beam and directs the combined beam into the beam splitter system. The beam splitter system splits the combined beam into a plurality of separated beams and directs the separated beams into the interferometer optics. The interferometer optics then split each of the separated beams into a reference beam and a measurement beam and direct each of these measurement beams for at least one reflection from the measurement reflector. The interferometer optics similarly directs the separated reference beams for one or more reflections from a reference reflector or reflectors. For each of the separated beams, the interferometer optics recombine the reference and measurement beams to form a separated output beam in which the reference and measurement beams are collinear.

The return reflector is generally such that shifting of an incident path of the incident beam causes shifting of the reflected beam, and the shifting of the reflected beam is identical in magnitude and direction to the shifting of the incident beam. The return reflector can include, for example, an isosceles prism having a base oriented so that the base is perpendicular to the combined beam.

Yet another embodiment of the invention is a multi-axis plane-mirror interferometer including a polarizing beam splitter, a measurement reflector system, a reference reflector system, a return reflector, and a non-polarizing beam splitter system. The polarizing beam splitter splits an input beam into a combined measurement beam and a combined reference beam. The measurement and reference reflector systems including plane mirrors respectively receive and reflect back the combined measurement and reference beams from the polarizing beam splitter.

The return reflector receives the combined measurement beam and the combined reference beam from the polarizing beam splitter after the reflections from the measurement and reference reflectors and directs the combined beams into the non-polarizing beam splitter system. The return reflector generally reflects an incident beam such as the combined beams from the polarizing beam splitter in a manner such that shifting the incident beam results in a matching shift of a reflected beam.

The non-polarizing beam splitter system splits the combined measurement beam into a plurality of separated measurement beams that are directed into the polarizing beam splitter and splits the combined reference beam into a plurality of separated reference beams that are directed into the polarizing beam splitter.

Retroreflectors can receive the combined measurement beam, the combined reference beam, and the separated measurement and reference beams after first respective reflections from the respective measurement and reference reflector systems. The retroreflectors direct the combined measurement beam, the combined reference beam, and the separated measurement and reference beams for second reflections from the respective reflector systems. The pairs of reflections eliminate angular variations between the measurement and reference beams due to misalignment of the reflector systems. Walk-off between the combined measurement and reference beams cancels subsequent walk-off between the separated measurement and reference beams.

Still another embodiment of the invention is a method for operating an interferometer. The method includes directing an input beam into the interferometer, where interferometer optics split the input beam into a reference beam and a measurement beam, cause the measurement beam to reflect from a reflector mounted on an object being measured, directs the measurement and reference beams out of the interferometer optics as a combined beam. The combined beam is then split into a plurality of separated beams that are directed into the interferometer optics. For each separated beam, the interferometer optics splits the separated beam into a reference beam and a measurement beam, causes the measurement beam to reflect from the reflector mounted on the object being measured, and direct the reference and measurement beams out of the interferometer optics as an output beam corresponding to the separated beam. Analysis of the output beams determines measurements along multiple axes.

BRIEF DESCRIPTION OF THE DRAWINGS

Use of the same reference symbols in different figures indicates similar or identical items.

DETAILED DESCRIPTION

In accordance with an aspect of the invention, an interferometer has a passive optical system that returns measurement and reference beams for additional passes through interferometer optics to eliminate beam walk-off in the final output beam. In one embodiment, the returned beams exactly retrace their respective paths to exit as collinear beams that coincide with the input beam. For this embodiment, a plane mirror perpendicular to the output path of a conventional interferometer can return reference and measurement beams for the retracing. Alternatively, the returning reference and measurement beams can be parallel to but offset from the original output paths. An optical element such as an isosceles prism can return the beams with the desired direction and offset.

In a multi-axis interferometer, splitting that separates beams for the separate measurement axes can occur after a combined beam makes a first pass through the interferometer optics and after a reflection from a return reflector. The combined beams are "combined" in that the beams have not yet been split for measurements along different axes. As a result, a multi-axis interferometer in accordance with the invention that eliminates beam walk-off only requires one more beam path than does a conventional multi-axis interferometer that is subject to beam walk-off. Further, the multi-axis interferometer with no beam walk-off can use a single return reflector for the combined beam rather than separate return reflectors for each measurement axis. A multi-axis interferometer in accordance with the invention can be made compact.

Figure 2:
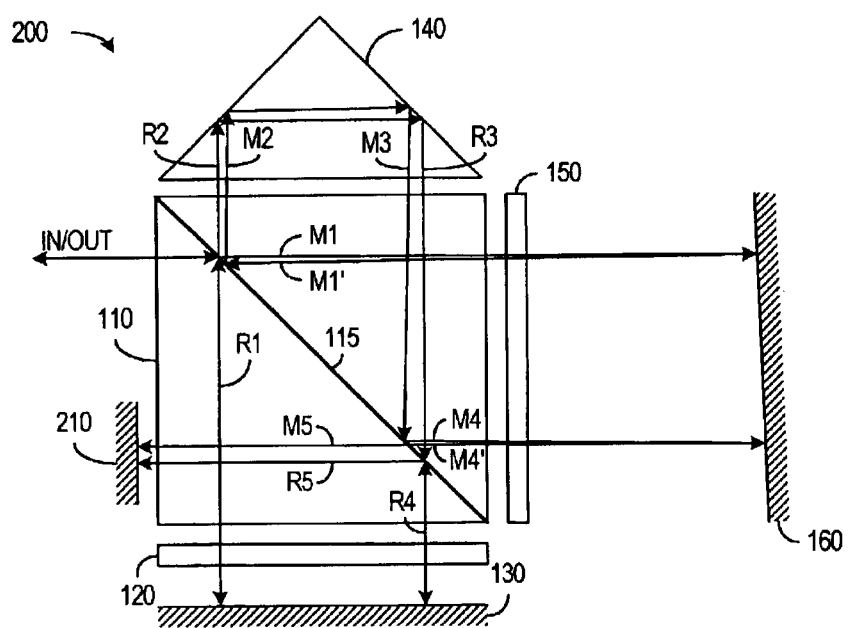
FIG. 2 shows an embodiment of the invention that eliminates walk-off using a reflector that returns measurement and reference beams to retrace their respective paths.

FIG. 2 shows a plan view of optical elements of a single-axis, plane mirror interferometer 200 in accordance with an embodiment of the invention. As illustrated, interferometer 200 contains optics including a polarizing beam splitter 110, quarter-wave plates 120 and 150, a reference reflector 130, a cube corner reflector 140, and a measurement reflector 160, which can be of conventional design.

Interferometer 200 receives an input beam along a path IN/OUT. Interferometer 200 can either be a DC interferometer in which the input beam is preferably monochromatic or an AC interferometer in which the input beam is preferably a beam containing two orthogonally polarized components having slightly different frequencies. DC and AC interferometers are well known in the art. For illustrative purposes, an exemplary embodiment of the invention in which interferometer 200 is an AC interferometer is described below. A DC interferometer would have beam paths identical to those described below but differs from an AC interferometer in the nature of the input beam and the processing of the merged output beam to measure movement of an object.

In an AC interferometer, each frequency component of the input beam has a linear polarization that is orthogonal to the linear polarization of the other frequency component. Current beam sources can provide a heterodyne beam with frequency components having polarizations that are highly, if not perfectly, linear and orthogonal. A Zeeman split laser with appropriate polarizing optical elements can generate an input beam having the desired properties.

In the exemplary embodiment of the invention, the source of the input beam is a commercially available laser head such as a 5517D available from Agilent Technologies, Inc. The 5517 family of laser heads applies an axial magnetic field to the laser cavity of a He-Ne laser to cause the Zeeman splitting. Zeeman splitting in this manner generates a beam containing frequency components with a frequency difference f2-f1 of about 2 to 6 MHz and an average wavelength of about 633 nm. The two frequency components from the laser cavity have opposite circular polarizations, and a quarter-wave plate or other optical system converts the circular polarizations of the frequency components into orthogonal linear polarizations.

The beam source, e.g., the laser, is generally kept away from the interferometer optics to avoid thermal effects on the measurement system, and an optical system using fiber optics or direct beam transmission can deliver the input beam from the beam source to the interferometer optics along path IN/OUT. The linear polarizations of the delivered frequency components are along the separation axes of polarizing beam splitter 110.

Polarizing beam splitter 110 receives the input beam and splits the input beam into components according to linear polarization. In the exemplary embodiment of the invention, beam splitter 110 has a square cross-section and includes two prisms with an intervening beam splitter coating 115 at 45° with each face of beam splitter 110. Alternatively, a different geometry or a polarizing beam splitter containing a birefringent material might be used. Beam splitter 110 ideally provides total extinction of the light having the one linear polarization from the transmitted beam and total extinction of the light having the other linear polarization from the reflected beam, but some leakage of the wrong polarization will generally be present.

To provide a definite example, the following description refers to the component of the input beam that is initially reflected from beam splitter coating 115 as a reference beam and refers to the initially transmitted component as a measurement beam. Alternatively, the reflected beam could be the measurement beam, and the transmitted beam could be the reference beam.

In FIG. 2, the reference beam upon reflection from beam splitter coating 115 follows a path R1 through quarter-wave plate 120 to reference reflector 130. Reference reflector 130 in the illustrated embodiment is a plane mirror mounted on the same structure as beam splitter 110. The plane mirror is perpendicular to path R1 and therefore reflects the reference beam back along path R1. Traveling down and back along path R1 through quarter-wave plate 120 effectively rotates the polarization of the reference beam by 90°, and the reference beam passes through beam splitter coating 115 to path R2.

The reference beam traveling path R2 reflects from cube corner reflector 140 and exits cube corner reflector 140 along an offset path R3 back to beam splitter 110. From path R3, the reference beam passes through beam splitter coating 115 to a path R4. The reference beam traverses path R4 through quarter-wave plate 120 to reference reflector 130, reflects from reference reflector 130 and returns along path R4 back through quarter-wave plate 120 into polarizing beam splitter 110. The reference beam then reflects from beam splitter coating 115 to a path R5 leading to a return reflector 210.

Figure 1:
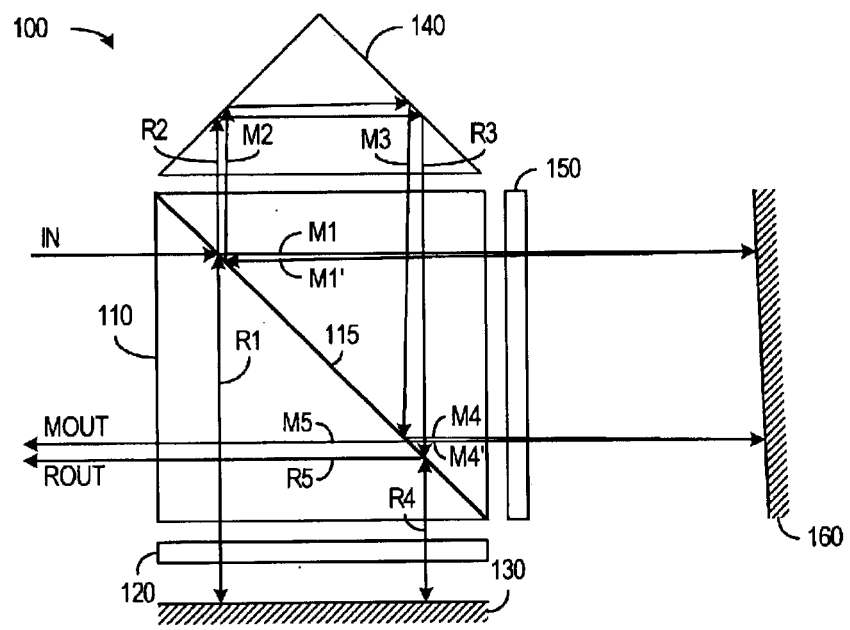
FIG. 1 illustrates a conventional interferometer having a misaligned measurement mirror that causes beam walk-off.

Path R5 corresponds to the output path ROUT in the conventional interferometer 100 of FIG. 1. In interferometer 200, return reflector 210 is a plane mirror that is aligned perpendicular to path R5 and therefore returns the reference beam to retrace path R5 back into polarizing beam splitter 110. Returning on path R5, the reference beam retraces paths R5, R4 (in both directions), R3, R2, and R1 (in both directions) to exit along path IN/OUT. The directions shown in FIG. 2 for the paths of the reference beam (and the measurement beam) are the directions corresponding to a first pass through the interferometer optics, and the directions of the reference beam after reflection from return reflector 210 are opposite to those illustrated in FIG. 2.

The component of the input beam transmitted through the beam splitter coating 115 at first incidence forms the measurement beam. The measurement beam then follows a path M1 through quarter-wave plate 150 to measurement reflector 160. Measurement reflector 160 is of the same type as reference reflector 130 and in interferometer 200, is a plane mirror that is nominally aligned perpendicular to path M1. Measurement reflector 160 is mounted on an object such as a translation stage that is being measured and is generally subject to variation in angular orientation. FIG. 2 shows measurement mirror 160 as out of ideal alignment. With the illustrated misalignment of the plane mirror, measurement reflector 160 reflects the measurement beam to path M1', which is at an angle with path M1.

Traveling twice through quarter-wave plate 120 along paths M1 and M1' effectively rotates the polarization of the measurement beam by 90°. At its second incidence on beam splitter coating 115, the measurement beam reflects from beam splitter coating 115 to path M2. If measurement reflector 160 were perfectly aligned to path M1, paths M1 and M1' would coincide, and paths M2 and R2 would coincide. With the illustrated misalignment, paths R2 and M2 are skewed and offset from each other.

The measurement beam traveling path M2 reflects from cube corner reflector 140 and exits cube corner reflector 140 along an offset path M3 back to beam splitter 110. From path M3, the measurement beam reflects from beam splitter coating 115 to a path M4. The measurement beam traverses path M4 through quarter-wave plate 150 to measurement reflector 160 and reflects from measurement reflector 160 onto path M4'. The measurement beam then returns along path M4' back through quarter-wave plate 150 into polarizing beam splitter 110.

The polarization changes from traversing quarter-wave plate 150 twice cause the measurement beam on path M4' to pass through beam splitter coating 115 to a path M5 leading to return reflector 210. Measurement path M5 (like path M4') is parallel to reference path R5 because cube corner reflector 140 makes path M3 parallel to path M2 and the second reflection from reference reflector 160 undoes the angular variation originating from the first reflection from measurement reflector 160.

Path M5 corresponds to the output path MOUT in the conventional interferometer optics of FIG. 1. Return reflector 210 returns the measurement beam to retrace paths M5, M4', M4, M3, M2, M1' and M1 and exit polarizing beam splitter 110 along path IN/OUT. The output measurement beam is thus collinear with the output reference beam and on the same axis as the input beam. Since the measurement beam retraces its path through the interferometer optics, the return pass undoes any effects of the yaw or pitch variation of measurement reflector 160. Similarly, if reference reflector 130 were misaligned, returning the reference beam to retrace its path through the interferometer optics undoes any beam walk-off that misalignment of reference reflector 130 might have otherwise caused.

Another feature of interferometer 200 is that the measurement beam reflects from measurement reflector 160 four times. Accordingly, the Doppler shift in the frequency of the output measurement beam is twice that of the conventional interferometer 100 of FIG. 1, effectively doubling the measurement resolution. Conventional electronic systems that measure the Doppler shift in the beat frequency of a merged beam and then calculate the movement that caused the shift can be adapted for the larger Doppler shifts.

The second pass of the measurement and reference beams through interferometer 200 after return reflector 210 causes attenuation or loss of optical power. However, the optical power in the beam overlap, which provides the measured signal, will be constant and generally greater than the power from the worst case beam overlap provided in a conventional interferometer such as illustrated in FIG. 1. Accordingly, interferometer 200 can use a lower power beam source and use receiver electronics with less dynamic range than conventional interferometers may require.

Figure 3A:
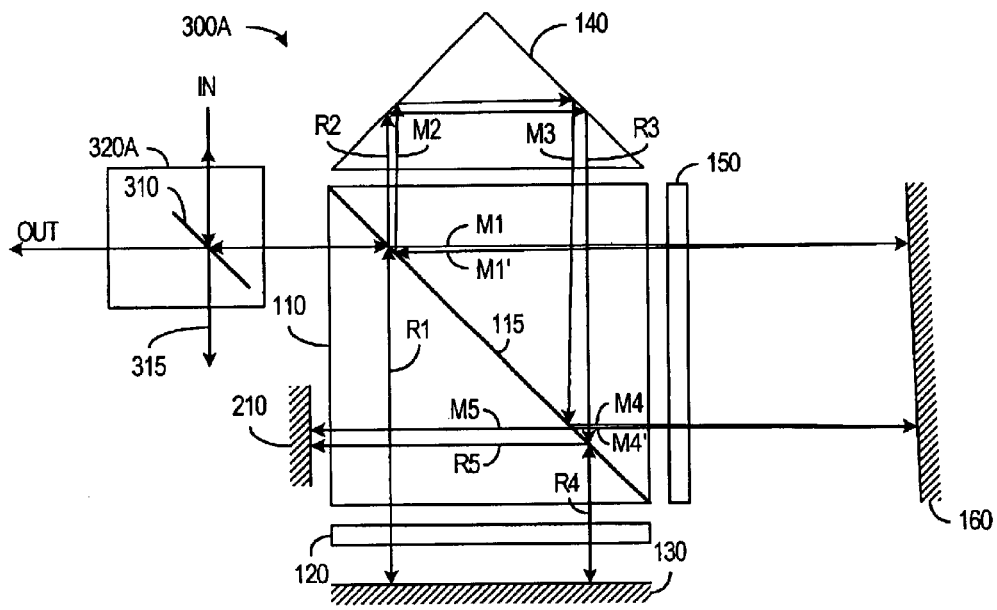
FIGS. 3A and 3B show interferometer optics for embodiments of the invention having alternative systems for separating input and output beams.

Having the merged output beam along the same axis as the input beam generally requires some system to avoid blocking the input beam when directing the output beam into a receiver for the measurement electronics. FIG. 3A illustrates an interferometer 300A including an input/output separation system 320A that employs a beam splitter 310 (e.g., a half-silvered mirror) to separate the output beam from the input beam. Beam splitter 310 receives the input beam and reflects a portion of the input beam into polarizing beam splitter 110. A remainder 315 of the input beam is transmitted through beam splitter 310 and lost if the remainder 315 cannot be directed to another use such as for measurements along another axis in a multi-axis interferometer. Beam splitter 310 also receives the merged beam output from polarizing beam splitter 110, transmits part of the merged beam for measurement, and reflects a part, which is lost.

Figure 3B:
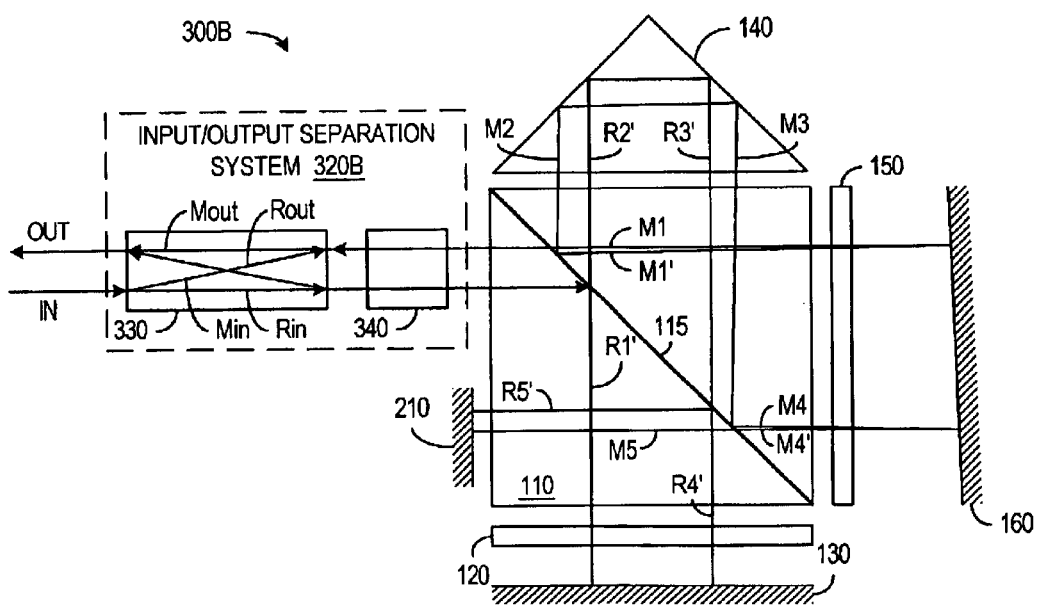

FIG. 3B illustrates an interferometer 300B including an input/output beam separation system 320B that redirects the output beams to a path offset from the input beam path. In the embodiment of FIG. 3B, beam separation system 320B includes a birefringent prism 330 and a polarization-rotating element 340.

The input beam for interferometer 300B is the same as the input beam for interferometer 200 of FIG. 2, except for the directions of the linear polarizations. The frequency components of the input beam for interferometer 300B have linear polarizations that are aligned with the birefringence axes of prism 330 and at an angle such as 45° with the axes of polarizing beam splitter 110.

Birefringent prism 330, which can be a calcite beam displacer such as commercially available from suppliers such as Karl Lambrecht, receives the input beam and separates a polarization component Min that corresponds to the measurement beam from a polarization component Rin that corresponds to the reference beam. The polarization components Min and Rin exit prism 330 offset from each other.

Polarization rotating element 330, which can be a quarter-wave Faraday rotator, rotates the polarizations of beams Min and Rin by a fixed angle, i.e., 45°, so that beams Min and Rin have linear polarizations corresponding to the axes of polarizing beam splitter 110.

The measurement beam Min follows paths M1, M1', M2, M3, M4, M4', and M5 and then reflects from return mirror 210 to retrace paths M5, M4', M4, M3, M2, M1', and M1 as described above. Polarizing beam splitter 110 thus outputs the measurement beam along the same axis along which the measurement beam entered polarizing beam splitter 110.

The reference beam follows paths R1', R2' (in both directions), R3', R4' (in both directions), and R5' and then reflects from mirror 210 to retrace paths R5', R4' (in both directions), R3', R2', and R1' (in both directions). The reference paths R1', R2', R3', R4', and R5' of FIG. 3 differ from the reference paths R1, R2, R3, R4, and R5 of FIG. 2 because the input reference beam Rin of FIG. 3B is offset from the input beam in FIG. 2. Polarizing beam splitter 110 thus outputs the reference beam along the same axis along which the reference beam Rin entered polarizing beam splitter 110.

The measurement and reference beams exit polarizing beam splitter 110 offset from each other by a distance equal to the offset that prism 330 created. This offset differs from an offset corresponding to beam walk-off because the offset in interferometer 300B is fixed and independent of variations in the orientations of measurement reflector 160 or reference reflector 130.

Polarizing element 340 again rotates the polarizations of the output beams by 45°. The entry and exit trips through polarizing element 340 rotate the polarizations of the measurement and reference beams by 90° so that birefringent prism 330 deflects the measurement beam and transmits the reference beam. The output reference and measurement beams exit along an output path OUT that is separated from the input path IN, and therefore more easily directed into measurement devices without blocking the input beam.

Figure 4A:
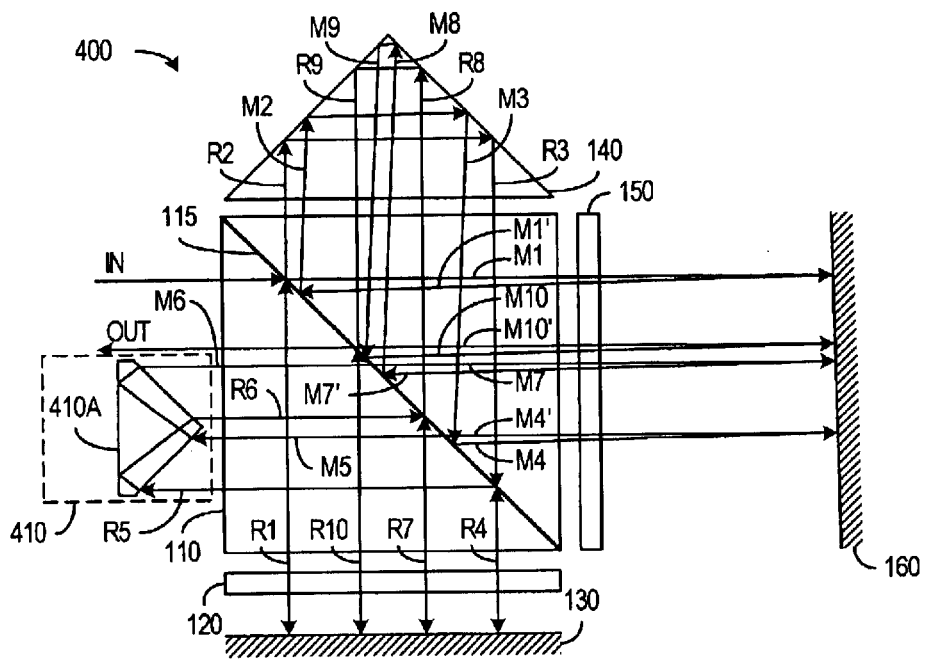
FIGS. 4A, 4B, and 4C show alternative embodiments of the invention that eliminate beam walk-off using optical elements that return and offset measurement and reference beams.

In accordance with another aspect of the invention, a reflector that returns the measurement and reference beams for an additional pass through the interferometer optics can offset the returned beams. FIG. 4A shows interferometer 400 including a return reflector 410 that provides a reflected beam that is offset from the incident beam.

Interferometer 400 uses a beam source (not shown) and an input beam that are substantially identical to the beam source and input beam described above for interferometer 200 of FIG. 2. On a first pass through the interferometer optics, the reference beam and the measurement beam follow the same paths as described above in regard to FIG. 2. In particular, the reference beam traverses paths R1 (in both directions), R2, R3, R4 (in both directions), and R5 before reaching return reflector 410A. The measurement beam traverses paths M1, M1', M2, M3, M4, M4', and R5 before reaching return reflector 410A.

Return reflector 410 reflects the incident reference beam from path R5 to an offset path R6 back to polarizing beam splitter 115 and reflects the incident measurement beam from path M5 to an offset path M6 back to polarizing beam splitter 115. For any measurement or reference beam incident on return reflector 410, the reflected beam has a direction opposite the direction of the incident beam and is offset from the incident beam by the same distance regardless of the position of the incident beam. A plane mirror perpendicular to the incident beams has these properties for the limiting case of an offset distance equal to zero.

In interferometer 400, return reflector 410 has optical faces acting as an isosceles prism 410A with a reflective base perpendicular to the incident reference and measurement beams. Isosceles prisms 410A are easily constructed as a triangular prism with internal angles 90°, 45°, and 45°. The base of isosceles prism 410A can be coated with a highly reflective coating, or isosceles prism 410A may alternatively have a sufficiently high refractive index to provide total internal reflection at the base when light is incident on either of the other sides along a direction perpendicular to the base. The position and orientation of isosceles prism 410A in FIG. 4A is such that measurement and reference beams are incident on the same face of isosceles prism 410A for a full range of tolerated beam walk-off distance. The reference beam is preferably incident at the center of the face.

Figure 4B:
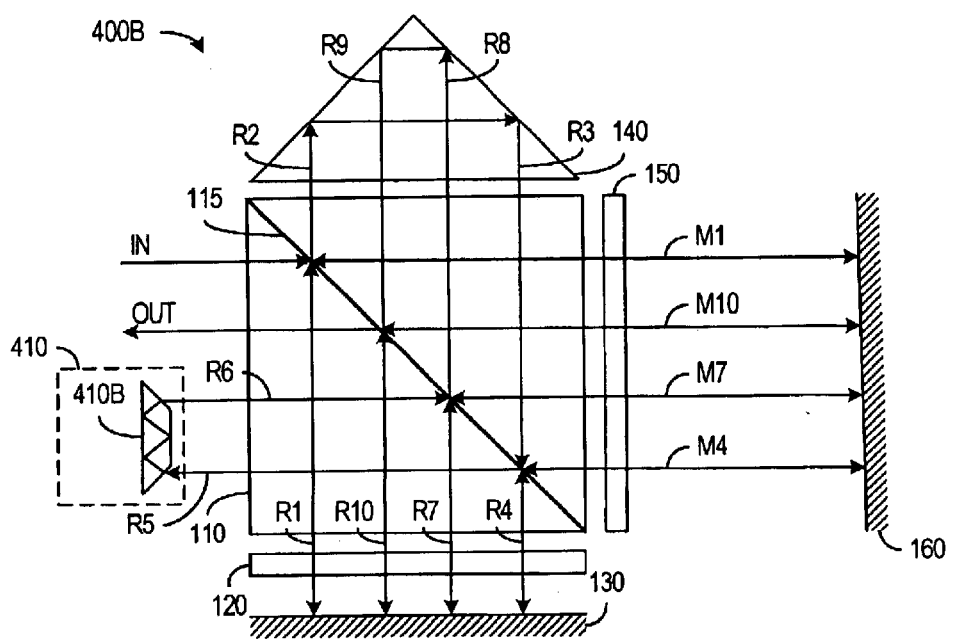

FIG. 4B illustrates an alternative interferometer 400B that is identical to interferometer 400 of FIG. 4A except that the return reflector 410 in interferometer 400B is a trapezoid prism 410B. Trapezoid prism 410B has a reflective base and a reflective top that are perpendicular to the incident measurement and reflective beams. The reference and measurement beams are incident on one of the slanted faces of trapezoid prism 410B, enter trapezoid prism 410B, and reflect at least once from the base and top of the prism before exiting through the opposite slanted face. The slanted facets have the same lengths and are at the same angles with the base of trapezoid prism 410B. Trapezoid prism 410B performs in substantially the same manner as isosceles prism 410A, but provides a relatively larger offset. Additionally, the top of trapezoid prism being flat allows prism 410B to be bonded directly to polarizing beam splitter 110.

Figure 4C:
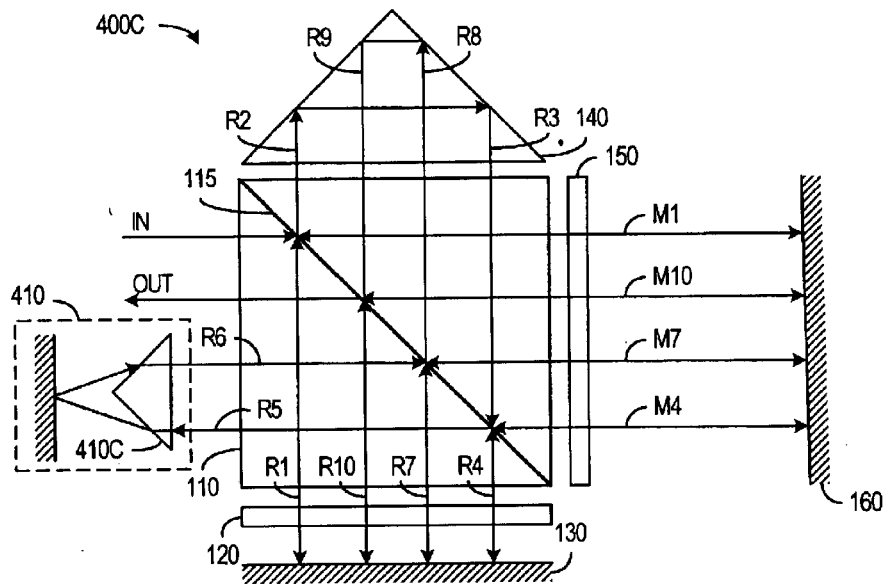

FIG. 4C illustrates yet another alternative interferometer 400C according to an embodiment of the invention in which return reflector 410 includes an isosceles prism 410C with its base toward polarizing beam splitter 110. The apex of isosceles prism 410C is towards a plane mirror. A merged beam incident on the base of isosceles prism 410C is refracted upon exiting isosceles prism 410C, reflects from the plane mirror, and is refracted upon re-entering isosceles prism 420C. Return reflector 410 returns the reflected beam along a path parallel to and offset by a fixed distance from the path of the incident beam.

FIGS. 4A, 4B, and 4C illustrate specific optical elements 410A, 410B, and 410C for different embodiments of a return reflector 410 that return incident measurement and reference beams along return paths that are parallel to corresponding incident paths and that shift the return paths to match any shift in the incident paths. More generally, other optical systems can implement the required properties of return reflector 410.

Each of FIGS. 4A, 4B, and 4C also shows a configuration where return reflector 410 provides a horizontal offset that is in a plane containing the reference paths when the interferometer has the ideal alignment. Alternatively, the orientation of the return reflector 410 can provide an offset at an angle with the plane containing the reference paths and particularly a vertical offset that is perpendicular to the plane of reference beams. In the views illustrated, the reference and measurement beams, if returned with a vertical offset, would appear to exactly retrace their first pass through the interferometer optics.

For the horizontal offset, the returned reference beam follows paths R6, R7 (in both directions), R8, R9, and R10 (in both directions) before reflecting from beam splitter coating 115 onto an output path OUT. The returned measurement beam follows paths M6, M7, M7', M8, M9, M10, and M10' before passing through beam splitter coating 115 to output path OUT. The output measurement and reference beams will be collinear on output path OUT provided that the optical surfaces (e.g., beam splitter coating 115, quarter-wave plates 120 and 150, cube corner 140, and reflectors 130 and 160) are spatially uniform and the normal to the reflective surface of return reflector 410 is parallel to beam paths M5 and R5. The output path OUT being separated from the input path IN facilitates measuring the merged beam without blocking with the input beam.

Figure 5:
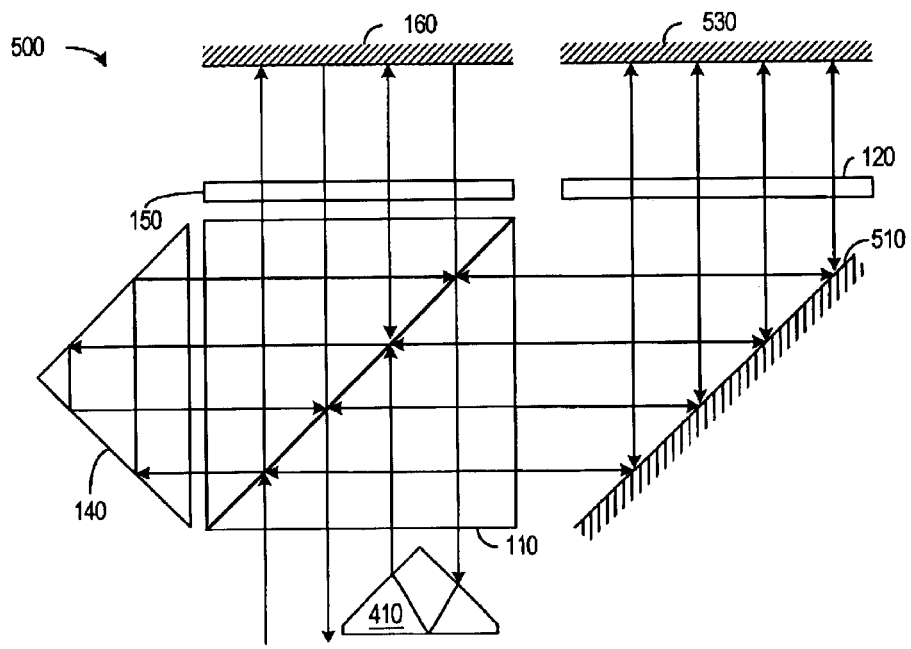
FIG. 5 illustrates a differential plane-mirror interferometer in accordance with an embodiment of the invention.

Aspects of the invention can be applied to many interferometer types and configurations. FIG. 5 shows a differential interferometer 500 as another exemplary embodiment of the invention. Differential interferometer 500 measures the difference in the positions of a first object on which a measurement reflector 160 is mounted and a second object on which a reference reflector 530 is mounted. Interferometer 500 of FIG. 5 differs from interferometer 400 of FIG. 4A predominantly in that reference reflector 530 (with an associated folding mirror 510) replaces the fixed reference reflector 130 illustrated in FIG. 4A.

Beam paths illustrated in FIG. 5 are the paths followed when reflectors 160 and 530 and other optical elements of interferometer 500 are ideally aligned. However, in differential interferometer 500, both reflectors 160 and 530 may be subject to independent angular variations that would cause beam walk-off in a conventional differential interferometer. Differential interferometer 500 uses the return reflector 410 to direct both measurement beams back for a second pass through the interferometer optics and thereby eliminates beam walk-off that misalignment of reflectors 160, 510, or 530 might otherwise cause.

Figure 6:
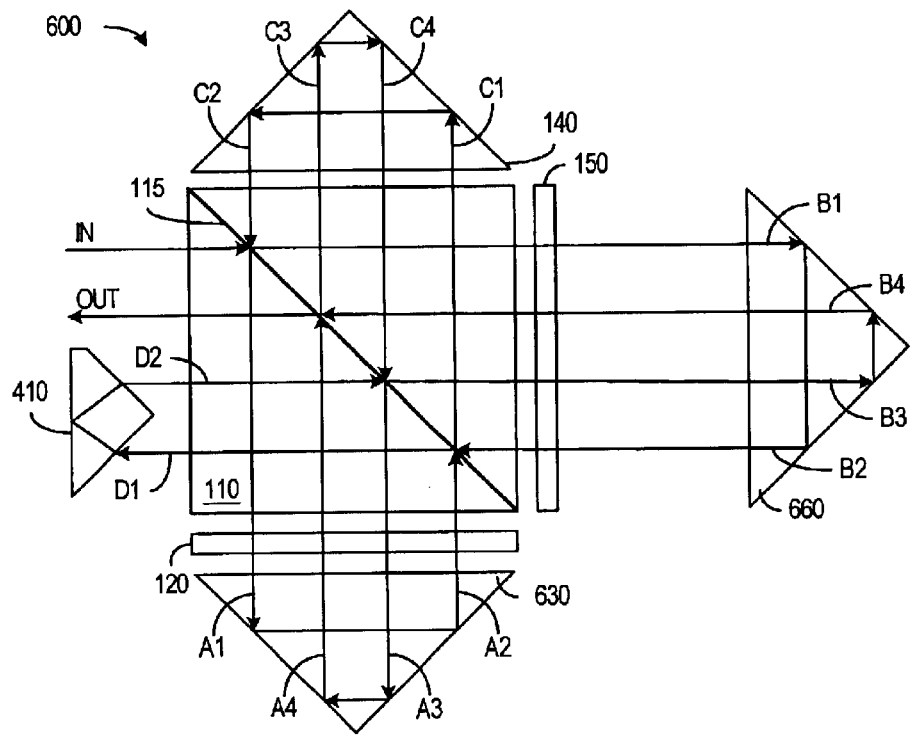
FIG. 6 shows an interferometer in accordance with an embodiment of the invention employing cube corner reflectors for reference and measurement reflectors.

FIG. 6 illustrates a multi-pass linear interferometer 600 in which a reference reflector 630 and a measurement reflector 660 are retroreflectors such as cube corner reflectors. Retroreflectors 630 and 660 replace plane mirror reflectors 130 and 160 of interferometer 400 (FIG. 4A), but interferometer 600 otherwise contains the same elements as described above in reference to FIG. 4A.

Retroreflectors return an incident beam along a reflected path that is parallel to but offset from the incident path. Accordingly, the paths of the reference and measurement beams in interferometer 600 differ from the paths in interferometer 400. With the ideal alignment of interferometer 600, the reference beam traverses paths A1, A2, C1, C2, A1, A2, and D1 on a first pass through the interferometer optics. Return reflector 410 then returns the reference beam to follow paths D2, A3, A4, C3, C4, A3, A4, and OUT. With the ideal alignment, the measurement beam traverses paths B1, B2, C1, C2, B1, B2, and D1 on a first pass through the interferometer optics. Return reflector 410 then returns the measurement beam to follow paths D2, B3, B4, C3, C4, B3, B4, and OUT.

The amount of the offset that a cube corner provides depends on the distance of the incident beam from the vertex of the cube corner, and the ideal alignment requires alignment of the vertex of measurement reflector 660 relative to the vertex of reference reflector 630. If the vertices of reflectors 630 and 660 are not properly aligned with each other, the reflected measurement path B2 will not be incident on beam splitter coating 115 at the same point where reflected reference path A2 is incident on beam splitter coating 115. As a result, one of the reference or measurement beams will be offset from path D1, which causes beam walk-off for conventional interferometers. Interferometer 600 eliminates this walk-off by returning the measurement and reference beams for another pass through the interferometer optics. On the second pass, the misalignment causes an offset that cancels the offset created during the first pass. Interferometer 600 thus eliminates the beam walk-off.

Figure 7:
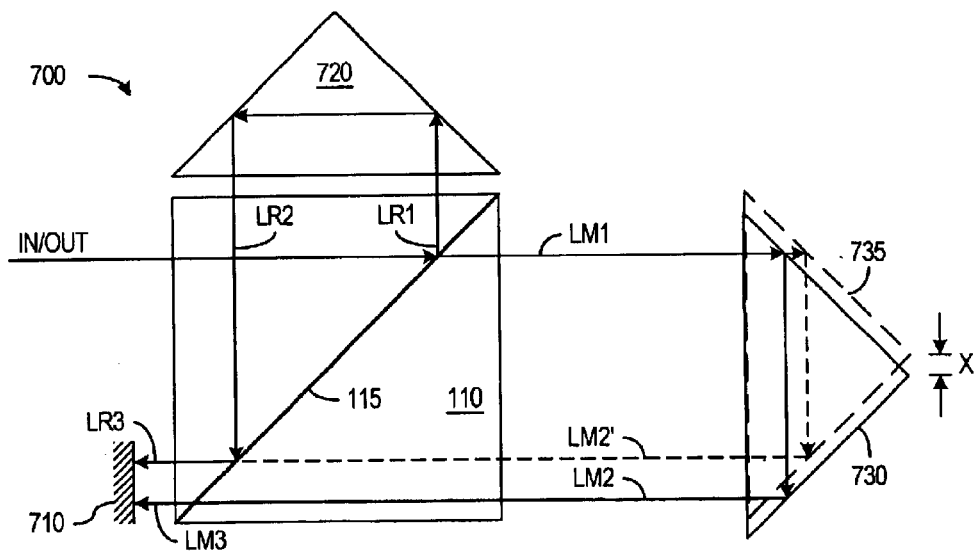
FIG. 7 illustrates a linear interferometer in accordance with an embodiment of the invention employing a plane mirror as a return reflector that directs reference and measurement beams to retrace paths through the interferometer.

FIG. 7 shows an interferometer 700 in accordance with yet another embodiment of the invention. Interferometer 700 is a linear interferometer that includes a polarizing beam splitter 110, a reference reflector 720, and a measurement reflector 730. As with the other embodiments of the invention, linear interferometer 700 can employ a monochromatic input beam or a two-frequency input beam that includes two orthogonal linear polarization components having slightly different frequencies. Polarizing beam splitter 110 splits an input beam received along path IN/OUT into a first polarization component that reflects from beam splitter coating 115 to form a reference beam and a second polarization component passes through beam splitter coating 115 to form a measurement beam.

During a first pass through the interferometer optics, the reference beam reflects from the input beam onto a path LR1 leading to reference reflector 720. Reference reflector 720 is a retroreflector such as a cube corner reflector and reflects the reference beam from path LR1 onto an offset path LR2 having the opposite direction from reference beam LR1. The reference beam on path LR2 reflects from beam splitter coating 115 onto a path LR3 to return reflector 710.

The measurement beam during a first pass through the interferometer optics passes through beam splitter coating 115 onto a path LM1 to measurement reflector 730. Measurement reflector 730, like reference reflector 720, is a retroreflector. If measurement reflector 730 is in a position 735 that is aligned to the position of reference reflector 720, the measurement beam exits measurement reflector 730 along a path LM2' and passes through beam splitter coating 115 onto path LR3. Accordingly, if reflectors 720 and 730 are properly aligned, the reference and measurement beams are collinear along path LR3 and could then be output as a merged beam for measurement of the movement of measurement reflector 730 along its axis.

If the measurement reflector 730 is offset from the ideal position 735, e.g., by a distance X in FIG. 7, measurement reflector 730 reflects the measurement beam from path LM1 to path LM2, which is offset from the ideal measurement path LM2' by 2X. Accordingly, upon passing back through beam splitter coating 115, the measurement beam is on a path LM3 that is offset from reference path LR3 by a distance that depends on the misalignment distance X. In a conventional linear interferometer, the distance between paths LM3 and LR3 is beam walk-off.

Return reflector 710 returns the measurement and reference beams for another pass through the interferometer optics so that the measurement and reference beams retrace their paths and exit as a collinear beam along axis IN/OUT. In FIG. 7, return reflector 710 is a plane mirror perpendicular to paths LR3 and LM3 so that the reference and measurement beams on a second pass through the interferometer optics retrace path LR3, LR2, and LR1 and LM3, LM2, and LM1, respectively. FIG. 7 illustrates paths LR1, LR2, LR3, LM1, LM2, and LM3 with directions corresponding to the first pass through the interferometer optics, and the beams during the second pass have directions opposite those illustrated in FIG. 7. The reference and measurement beams both exit along the input path IN/OUT, and walk-off is eliminated.

Figure 8:
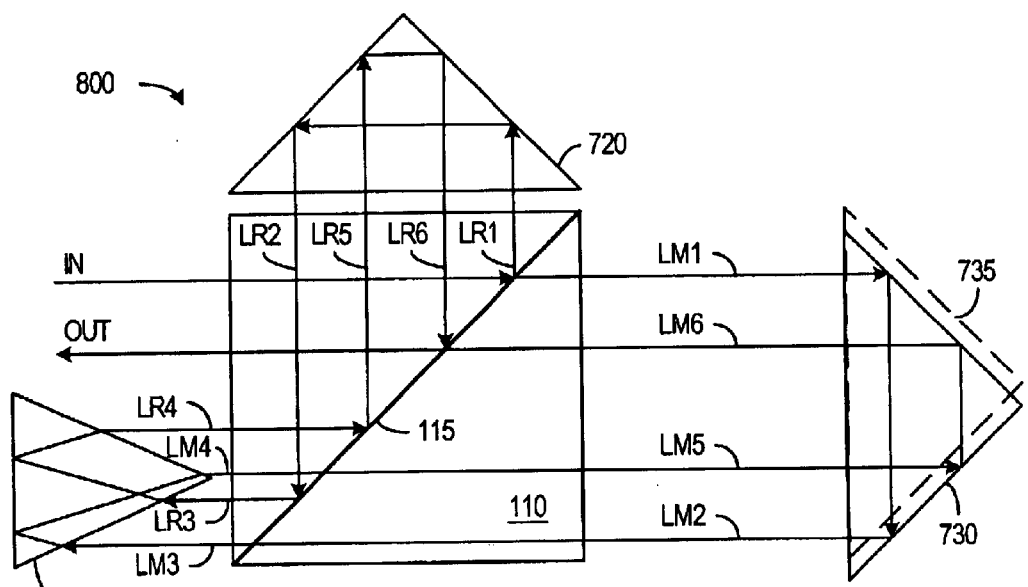
FIG. 8 illustrates a linear interferometer in accordance with an embodiment of the invention employing a return reflector that directs reference and measurement beams to retrace paths parallel to but offset from original paths through the interferometer.

FIG. 8 illustrates a linear interferometer 800 in which a return reflector 810 reflects and offsets the measurement and reference beams. In interferometer 800, the reference beam from input path IN follows paths LR1, LR2, and LR3 to return reflector 810 and returns from return reflector 810 along paths LR4, LR5, and LR6 to output path OUT. The measurement beam from input path IN follows paths LM1, LM2, and LM3 to return reflector 810 and returns from return reflector 810 along paths LM4, LM5, and LM6 to output path OUT. The output reference and measurement beams are thus collinear for most efficient combination and are offset from input path IN, which facilitates measuring the merged beam without blocking the input beam.

Figure 9:
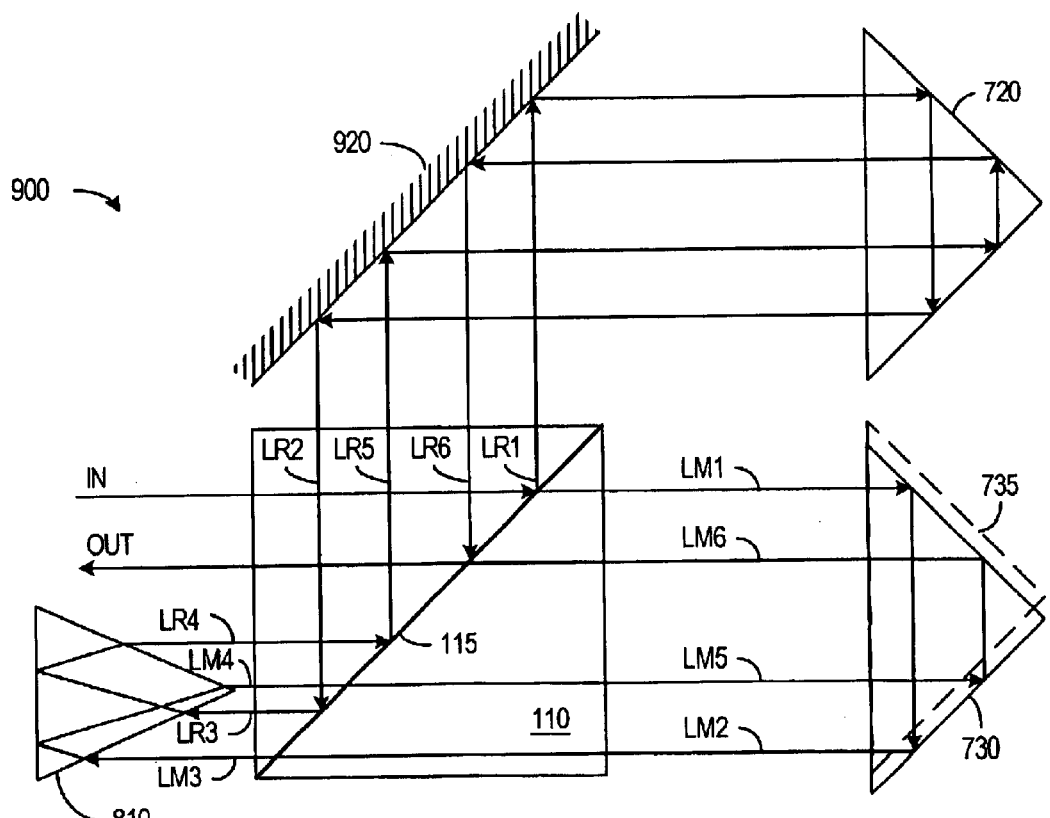
FIG. 9 illustrates a differential, linear interferometer in accordance with an embodiment of the invention.

FIG. 9 illustrates yet another alternative embodiment of the invention which is a differential, linear interferometer 900. Interferometer 900 has reference reflector 720 mounted on an object instead of having a fixed mounting, and a reflector 920 directs the reference beam between polarizing beam splitter 110 and reference reflector 720. In interferometer 900, both reference reflector 720 and measurement reflector 730 can move and change the relative alignment of reflectors 720 and 730. However, return reflector 810 directs the reference and measurement beams for a second pass through the interferometer optics to eliminate beam walk-off that would otherwise arise.

Figure 10:
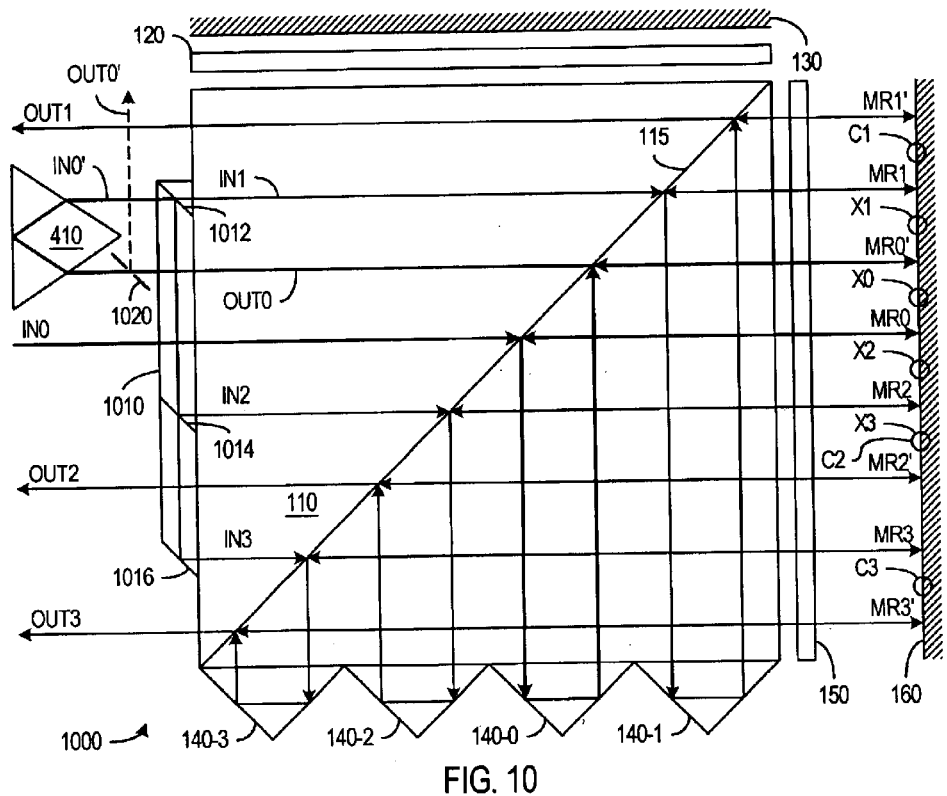
FIG. 10 shows a multi-axis interferometer using a combined beam for a first pass through interferometer optics and separated beams for a second pass through the interferometer optics.

FIG. 10 shows a multi-axis interferometer 1000 in accordance with yet another embodiment of the invention. Interferometer 1000 uses a combined input beam IN0 that a beam splitter system 1010 eventually splits into separated beams for measurements along separated measurement axes. FIG. 10 shows the specific example of an interferometer having three separated beams for three measurement axes, but in a more general case, combined input beam IN0 can be separated into any number N of separated beams for an interferometer having N measurement axes. Combined input beam IN0 can be either a heterodyne or monochromatic beam as described above, depending on whether interferometer 1000 operates as an AC interferometer or a DC interferometer.

Input beam IN0 enters polarizing beam splitter 110 without being split into components for the different measurement axes. In FIG. 10, input beam IN0 passes through a transparent section of beam splitter system 1010 into polarizing beam splitter 110, but combined input beam IN0 could alternatively enter polarizing beam splitter 110 directly, either above or below beam splitter 1010. Polarizing beam splitter 110 splits combined input beam IN0 by polarization into a combined reference beam and a combined measurement beam. These measurement and reference beams are "combined" in that the beams have not yet been split for measurements along different axes. The combined reference beam initially reflects from beam splitter coating 115 and heads towards quarter-wave plate 120 and reference reflector 130. The combined measurement beam initially passes through beam splitter coating 115 on the way to quarter-wave plate 150 and measurement reflector 160. For clarity, FIG. 10 illustrates only the paths of measurement beams for an ideal alignment of measurement reflector 160.

The combined measurement beam passes through beam splitter coating 115 and quarter-wave plate 150, undergoes a first reflection MR0 from measurement mirror 160, returns through quarter-wave plate 150, reflects from beam splitter coating 115, reflects from retroreflector 140-0, reflects from beam splitter coating 115, passes through quarter wave plate 150, undergoes a second reflection MR0' from measurement mirror 160, and passes back through quarter-wave plate 150 and beam splitter coating 115. The combined reference beam similarly undergoes two reflections (not shown) from reference mirror 130 before merging with the exiting combined measurement beam to form a combined output beam OUT0.

Combined output beam OUT0 exits polarizing beam splitter 110 heading toward return reflector 410. Optionally, a non-polarizing beam splitter 1020 in the path of output beam OUT0 can direct a portion OUT0' of output beam OUT0 into a conventional analysis system (not shown). The system analyzing output beam OUT0' can measure the phase change caused by reflections MR0 and MR0' and determine the distance or velocity of a point X0 that is between reflections MR0 and MR0' on measurement mirror 160. Output beam OUT0' is however subject to beam walk-off, and measurements based on output beam OUT0' may not be as accurate as measurements based on beams without walk-off.

Return reflector 410 offsets and reflects output beam OUT0 so that a combined input beam IN0' returns onto a path to a first non-polarizing beam splitter coating 1012 in beam splitter system 1010. In the embodiment of FIG. 10, beam splitter system 1010 is a rhomboid assembly including three prisms (two rhomboid elements and one triangular prism) with two intervening non-polarizing beam splitter coatings 1012 and 1014. Rhomboid assembly 1010 can be manufactured and attached to polarizing beam splitter 110 using an index-matching adhesive or contact bonding. U.S. patent application Ser. No. 09/876,531, entitled "Multi-Axis Interferometer with Integrated Optical Structure and Method for Manufacturing Rhomboid Assemblies" describes methods for manufacturing rhomboid assemblies such as rhomboid assembly 1010 and attaching such assemblies to interferometer optics.

Non-polarizing beam splitter coating 1012 transmits a portion (e.g., one third) of combined beam IN0' as a separated input beam IN1 for a first measurement axis of interferometer 1000. The remainder of beam IN0' is reflected along a path in rhomboid assembly 1010 to non-polarizing beam splitter coating 1014. Non-polarizing beam splitter coating 1014 reflects a portion (e.g., one half) of the remainder of beam IN0' as a separated input beam IN2 for a second measurement axis of interferometer 1000. Reflection (e.g., total internal reflection) at an end surface 1016 of rhomboid assembly 1016 directs the final remainder of beam IN0' into polarizing beam splitter 110 as a separated input beam IN3 for a third measurement axis of interferometer 1000.

Polarizing beam splitter 110 splits each of the separated input beams IN1, IN2, and IN3 into corresponding measurement and reference beams. Input beam IN1, IN2, and IN3 separately pass through the interferometer optics with the measurement beams for beams IN1, IN2, and IN3 each having a pair of reflections from measurement reflector 160. A measurement beam from input beam IN1, for example, exits through quarter-wave plate 150, undergoes a first reflection MR1 from measurement mirror 160, and returns through quarter-wave plate 150 before polarizing beam splitter coating 115 and a retroreflector 140-1 directs the measurement beam back through quarter-wave plate 150 for a second reflection MR1' from measurement mirror 160. The reference beam from input beam IN1 similarly reflects from reference mirror 130 twice with an intervening pass through retroreflector 140-1 and four passes through quarter-wave plate 120 before the reference and measurement beams merge to form output beam OUT1. Similarly, an output beam OUT2 contains a measurement component characteristic of two reflections MR2 and MR2' from measurement reflector 160, and an output beam OUT3 contains a measurement component characteristic of two reflections MR3 and MR3' from measurement reflector 160.

As noted for the above embodiments of the invention, misalignment of measurement mirror 160 or reference mirror 130 can cause beam walk-off for combined output beam OUT0 and combined input beam IN0'. Each of separated input beams IN1, IN2, and IN3 inherits the beam walk-off from combined beam IN0', which creates a separation between the centers of the two linear polarization components of each input beam IN1, IN2, and IN3. The second pass through the interferometer optic, which beams IN1, IN2, and IN3 make as separated beams, eliminates the walk-off created in the combined beam IN0'. As a result, separated output beams OUT1, OUT2, and OUT3 are without walk-off.

Analysis of the phase information in each of separated output beams OUT1, OUT2, and OUT3 provides distance or velocity information for measurement axes through different points on measurement mirror 160. Output beam OUT1 has phase information that arises from four reflections MR0, MR0', MR1, and MR1' from measurement mirror 160. A distance or velocity determined from output beam OUT1 thus corresponds to a position or movement along a first axis, which is through a point X1 at an average position for the four reflections MR0, MR0', MR1, and MR1'. A measurement determined from separated output beam OUT2 similarly corresponds to measurement along a second axis through a point X2 at an average position for the four reflections MR0, MR0', MR2, and MR2', and a measurement determined from output beam OUT3 corresponds to measurement along an axis through a point X3 that is at the average position of the four reflections MR0, MR0', MR3, and MR3'.

Measurements for other measurement axes such an axis through a point C1 between reflections MR1 and MR1' or an axis through a point C3 between reflections MR3 and MR3' can be determined mathematically based on the geometry of interferometer 1000 and the measurements for measurement axes corresponding to points X1, X2, and X3 and the intermediate measurement for point X0. Equations 1 illustrate the relationships for distances to points X0, X1, X2, X3, C1, C2, and C3 in the specific geometry of interferometer 1000 with a planar measurement mirror 160. Such relationships can be used to derive measurements for other points and for crosschecks of the accuracy of measurements. For the geometry of interferometer 1000, for example, without walk-off measurement point X3 is the same as point C2. The direct and derived measurements X3 and C2 can thus be compared for accuracy. Other interferometer geometries will have different relationships between measurement points and different crosschecks.

$$X1 = \frac{X0 + C1}{2}$$

$$X2 = \frac{X0 + C2}{2}$$

$$X3 = \frac{X0 + C3}{2}$$

Equations 1:

Interferometer 1000 has three measurement axes that are all located in the same plane. Alternatively, measurement axes in a multi-axis interferometer can have measurement axes that are separated horizontally and vertically from other measurement axes.

Figure 11:
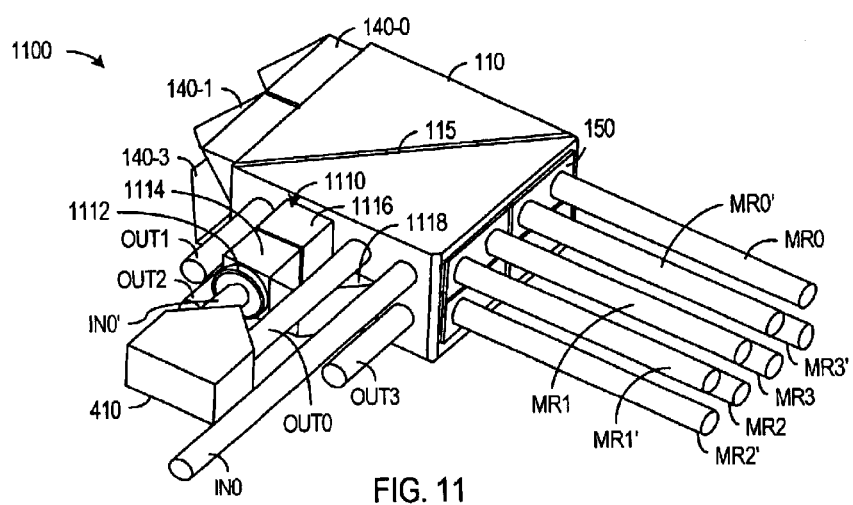
FIG. 11 is a perspective view of a three-axis interferometer in accordance with an embodiment of the invention.

FIG. 11 is a perspective view of an interferometer 1100 having measurement axes that are horizontally and/or vertically offset from each other. Interferometer 1100 operates in a manner similar to interferometer 1000 of FIG. 10 and receives an input beam IN0 having characteristics described above. Beam splitter coating 115 in polarizing beam splitter 110 reflects a portion of input beam IN0 to form a combined measurement beam and transmits a portion of input beam IN0 to form a combined reference beam (not show). For ease of illustration, FIG. 11 shows measurement beams but does not illustrate the reference beams that are internal to beam splitter 110. The reference beams reflect from a reference mirror that is not visible in the view of FIG. 11.

The combined measurement beam initially reflected from beam splitter coating 115 passes through quarter-wave plate 150 (which is shown attached to polarizing beam splitter 110), undergoes a reflection MR0 from the measurement mirror (not shown in FIG. 11), and returns through quarter-wave plate 150 to polarizing beam splitter 110. The returning combined measurement beam enters polarizing beam splitter 110 through quarter-wave plate 150, reflects from a retroreflector 140-0 attached to polarizing beam splitter 110, and again exits polarizing beam splitter 110 via quarter-wave plate 150 for a second reflection MR0' from the measurement mirror 160. When the second reflection MR0' returns the combined measurement beam via quarter-wave plate 150 to polarizing beam splitter 110, the combined measurement beam reflects from beam splitter coating 115 and passes out of polarizing beam splitter 110.

The combined measurement beam and the combined reference beam merge at polarizing beam splitter coating 115 and exit polarizing beam splitter 119 as a combined output beam OUT0. In combined output beam OUT0, the central axes of the measurement beam and the reference beam are parallel but may be offset from each other due to beam walk-off. A return reflector 410 reflects and offsets beam OUT0 to thereby input beam IN0' to a non-polarizing beam splitter system 1110 that is attached to polarizing beam splitter 110.

Beam splitter system 1110 splits combined beam IN0' into three separated beams for three measurement axes. A first measurement axis is vertically offset from the combined measurement beam. A second measurement axis is horizontally offset from the combined measurement beam, and a third measurement axis is vertically and horizontally offset from the combined measurement beams.

The illustrated embodiment of beam splitter assembly 1110 includes an input window 1112, a vertical rhomboid prism assembly 1114, an optical quality spacer block 1116, and a horizontal rhomboid prism assembly 1118. Combined beam IN0' from return reflector 410 is input through input window 1112 to a non-polarizing beam splitter coating in vertical rhomboid assembly 1114. The portion of beam IN0' transmitted through the beam splitter coating in rhomboid assembly 1114 enters polarizing beam splitter 110 through optical spacer block 1116, where polarizing beam splitter 110 separates reference and measurement beams for the first separated measurement axis. For the first separated measurement axis, FIG. 11 illustrates measurement beams that undergo reflections MR1 and MR1' from the measurement reflector.

The reflected beam from the beam splitter coating in rhomboid assembly 1112 reflects from the end of vertical rhomboid assembly 1114 onto a non-polarizing beam splitter coating in horizontal rhomboid prism assembly 1118. The portion of the beam transmitted through the beam splitter coating in rhomboid assembly 1118 enters polarizing beam splitter 110 and forms reference and measurement beams for the second separated measurement axis. For the second separated measurement axis, FIG. 11 illustrates measurement beams that undergo reflections MR2 and MR2' from the measurement reflector.

The reflected beam from the beam splitter coating in rhomboid assembly 1118 reflects from the end of horizontal rhomboid assembly 1118 and enters polarizing beam splitter 110. From this beam, polarizing beam splitter 110 forms reference and measurement beams for the third separated measurement axis. For the third separated measurement axis, FIG. 11 illustrates measurement beams that undergo reflections MR3 and MR3' from the measurement reflector.

Although the invention has been described with reference to particular embodiments, the description is only an example of the invention's application and should not be taken as a limitation. For example, although the above embodiments illustrate specific geometries for interferometers, embodiments of the invention can be more generally applied to other geometries and systems that need to eliminate beam walk-off. Additionally, although the above embodiments show interferometers having a specific numbers of measurement axis and specific geometries for the measurement axes, a multi-axis interferometer having any number of axes that are in any desired relation to each other can be manufactured according to the principles of the present invention. Various other adaptations and combinations of features of the embodiments disclosed are within the scope of the invention as defined by the following claims.

What is claimed is:

1. A multi-axis interferometer comprising:
   a first beam splitter system aligned to receive an input beam and separate the input beam into a first beam and a second beam;
   a first reflector system positioned to receive the first beam from the first beam splitter system, the first reflector system directing the first beam back to the first beam splitter system;
   a second reflector system positioned to receive the second beam from the first beam splitter system, the second reflector system directing the second beam back to the first beam splitter system, whereupon the first beam splitter system forms a combined beam in which central axes of the first and second beams are parallel and walked-off from each other by a distance that depends on relative misalignment of the first and second reflector systems;
   a return reflector positioned to receive the combined beam from the first beam splitter system; and
   a second beam splitter system positioned to receive at least a portion of the combined beam from the return reflector, wherein the second beam splitter system splits the portion received into a plurality of separated beams that are directed into the first beam splitter system.

2. The interferometer of claim 1, wherein the first beam splitter system splits each of the separated beams into beams that respectively reflect from the first and second reflector system and then recombines the reflected beams to form a separated output beam corresponding to the separated input beam.

3. The interferometer of claim 2, further comprising a plurality of retroreflectors, each of the retroreflectors reflecting the beams that the first beam splitter system splits from a corresponding one of the separated beams, wherein a portion of the each of the separated beams returns from the first reflector system twice before exiting in a corresponding one of the separated output beams.

4. The interferometer of claim 1, wherein the return reflector comprises an isosceles prism having a base perpendicular to the combined beam.

5. The interferometer of claim 1, wherein the first beam splitter system comprises a polarizing beam splitter.

6. The interferometer of claim 5, wherein:
   the first reflector system comprises a first quarter-wave plate and a reference reflector; and
   the second reflector system comprises a second quarter-wave plate and a measurement reflector, the measurement reflector being mounted on an object being measured by the interferometer.

7. The interferometer of claim 5, wherein the second beam splitter comprises a non-polarizing beam splitter.

8. The interferometer of claim 1, further comprising a retroreflector positioned to receive the first and second beams from the first beam splitter system and return the first and second beams to the first beam splitter system, wherein between the input beam and the combined beam, the first beam returns twice to the first beam splitter system from the first reflector system and the second beam returns twice to the first beam splitter system from the second reflector system.

9. An interferometer comprising:
   optics that split an input beam into a reference beam and a measurement beam and directs the measurement beam for at least one reflection from a measurement reflector on an object being measured, the optics recombining the reference and measurement beams into a combined beam in which the reference and measurement beams are parallel but subject to walk-off that depends on the alignment of the measurement reflector;
   a beam splitter system; and
   a return reflector positioned to receive the combined beam and direct the combined beam into the beam splitter system, wherein:
   the beam splitter system splits the combined beam into a plurality of separated beams and directs the separated beams into optics; and
   the optics split each of the separated beams into a separated reference beam and a separated measurement beam and directs each of the separated measurement beams for a least one reflection from the measurement reflector, for each of the separated beams, the optics recombining the separated reference beam and the separated measurement beam to form a merged beam in which the separated reference and measurement beams are collinear.

10. The interferometer of claim 9, wherein the return reflector is such that shifting of an incident path of the combined beam causes shifting of a reflected path of the combined beam, and the shifting of the reflected path is identical in magnitude and direction to the shifting of the incident path.

11. The interferometer of claim 10, wherein the return reflector comprises an isosceles prism having a base that is perpendicular to the combined beam.

12. A method for operating an inteferometer comprising:
   directing an input beam into interferometer optics that split the input beam into a reference beam and a measurement beam, cause the measurement beam to reflect from a reflector mounted on an object being measured, and recombine the measurement and reference beams to form a combined beam that is output from the interferometer optics;

splitting the combined beam into a plurality of separated beams;

directing the separated beams into the interferometer optics, wherein for each separated beam, the interferometer optics split the separated beam into a reference beam and a measurement beam, cause the measurement beam to reflect from the reflector mounted on the object being measured, and recombine the reference and measurement beams to form an output beam corresponding to the separated beam; and analyzing the output beams to determine measurements along multiple axes.

13. The method of claim 12, wherein splitting the combined beam comprises reflecting the combined beam using an isosceles prism that directs the combined beam into a system that splits the combined beam into the separated beams.

14. The method of claim 12, wherein each of the separated beams enters the interferometer optics parallel to and offset from the combined beam.

15. The method of claim 12, wherein each of the separated beams corresponds to a different measurement axis at a different location on the reflector mounted on the object being measured.

16. A multi-axis interferometer comprising:

a polarizing beam splitter positioned to split an input beam into a combined measurement beam and a combined reference beam;

a measurement reflector system including a plane mirror positioned to receive the combined measurement beam from the polarizing beam splitter;

a reference reflector system including a plane mirror positioned to receive the combined reference beam from the polarizing beam splitter;

a first retroreflector positioned to receive the combined measurement beam and the combined reference beam after respective first reflections from the measurement reflector system and the reference reflector systems, the first retroreflector sending the combined measurement beam and the combined reference beam back into the polarizing beam splitter;

a return reflector that reflects an incident beam in a manner such that shifting the incident beam results in a matching shift of a reflected beam, the return reflector being positioned to receive the combined measurement beam and the combined reference beam; and a non-polarizing beam splitter system that splits the combined measurement beam into a plurality of separated measurement beams that are directed into the polarizing beam splitter and splits the combined reference beam into a plurality of separated reference beams that are directed into the polarizing beam splitter.

17. The interferometer of claim 16, further comprising a plurality of second retroreflectors positioned to respectively receive the separated measurement and reference beams after respective reflections from the respective measurement and reference reflector systems.

18. The interferometer of claim 16, wherein:

the measurement reflector system further comprises a quarter-wave plate; and the reference reflector system further comprises a quarter-wave plate.

19. The interferometer of claim 16, wherein the return reflector comprises an isosceles prism.

20. The interferometer of claim 19, wherein the isosceles prism has a reflective base that is perpendicular to the measurement and reference beams incident on the isosceles prism.

* * * * *